(12) United States Patent
Hikmet et al.

(10) Patent No.: US 8,373,923 B2
(45) Date of Patent: Feb. 12, 2013

(54) ILLUMINATOR HAVING A SPATIAL LIGHT MODULATOR

(75) Inventors: Rifat Ata Mustafa Hikmet, Eindhoven (NL); Michel Cornelis Josephus Marie Vissenberg, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 772 days.

(21) Appl. No.: 12/067,048

(22) PCT Filed: Sep. 8, 2006

(86) PCT No.: PCT/IB2006/053182
§ 371 (c)(1),
(2), (4) Date: Mar. 17, 2008

(87) PCT Pub. No.: WO2007/031921
PCT Pub. Date: Mar. 22, 2007

(65) Prior Publication Data
US 2008/0225371 A1  Sep. 18, 2008

(30) Foreign Application Priority Data
Sep. 16, 2005 (EP) ..................................... 05108514

(51) Int. Cl.
*G02B 26/08* (2006.01)
*G03B 21/28* (2006.01)

(52) U.S. Cl. ................................. 359/298; 33/77; 33/78
(58) Field of Classification Search ............... 359/212.1, 359/238, 298; 353/77, 78, 82
See application file for complete search history.

(56) References Cited

U.S. PATENT DOCUMENTS

| | | | |
|---|---|---|---|
| 5,459,591 A | 10/1995 | Faris | |
| 5,622,418 A | 4/1997 | Daijogo et al. | |
| 5,806,950 A | 9/1998 | Gale et al. | |
| 6,623,144 B2 | 9/2003 | Bornhorst | |
| 7,123,417 B2 * | 10/2006 | Ishikawa et al. | 359/618 |
| 2005/0179978 A1 | 8/2005 | Lee et al. | |

FOREIGN PATENT DOCUMENTS

| | | |
|---|---|---|
| EP | 0807848 A2 | 11/1997 |
| JP | 01150117 A | 6/1989 |

* cited by examiner

*Primary Examiner* — Jack Dinh
(74) *Attorney, Agent, or Firm* — Mark L. Beloborodov

(57) ABSTRACT

The present invention relates to an illuminator (10, 30, 40) comprising a spatial light modulator (14) including an array of elements (16) each adapted to selectively transmit incoming light without altering the direction of the light, or alter the direction of incoming light; a lamp (12) arranged to illuminate the modulator; a lens (20, 42) for directing unaltered light from the modulator onto an illumination surface (24); and means for forwarding essentially all light altered in direction by the modulator towards the illumination surface.

5 Claims, 1 Drawing Sheet

ILLUMINATOR HAVING A SPATIAL LIGHT MODULATOR

Figure 1:
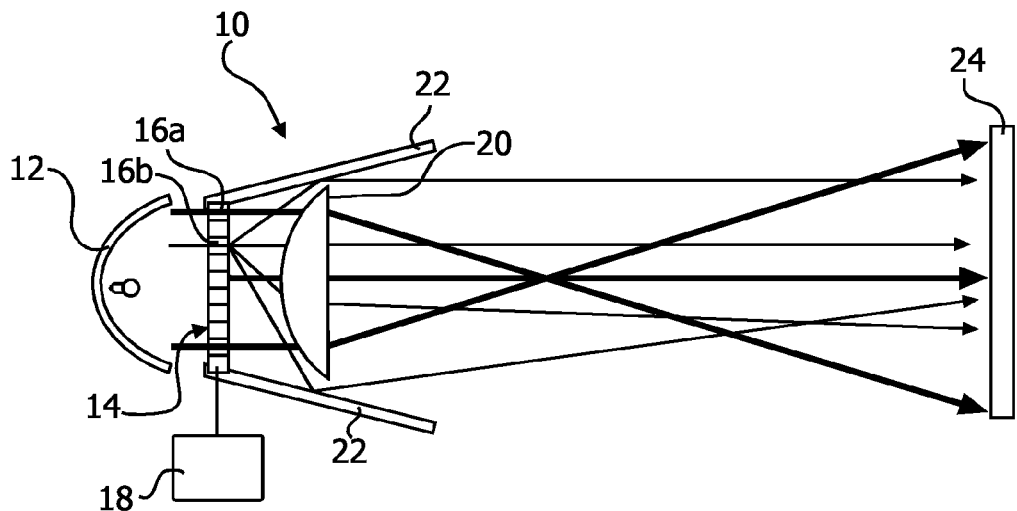

The present invention relates to an illuminator. In particular, it relates to a lighting device comprising a light modulator for allowing projection of lighting effects, such as images, patterns, texts, etc., onto an illumination surface.

Image projection devices of the prior art use light from a lamp that is sent through a light valve or modulator (such as a liquid crystal display (LCD)), wherein the image of the modulator is projected onto a projection surface using a projection lens.

The modulator usually comprises an array of addressable elements or pixels in order to produce images. In one type of image projection devices, each pixel is adapted to selectively transmit incoming light (without altering the direction) or alter the direction of incoming light (for example by means of scattering), such as disclosed in for example the document U.S. Pat. No. 5,622,418. The transmitted light can then be projected by the projection lens onto the projection surface to form an image, while at least part of the scattered light is absorbed in order to form high contrast images. In the system disclosed in U.S. Pat. No. 5,622,418, an entrance pupil of the projection lens acts to remove a portion of the light scattered at the liquid crystal light valve in order to increase the contrast of the projected image. Thus, a part of the light from the lamp is lost. While this is acceptable for display applications, it is not acceptable in lighting applications.

It is an object of the present invention to overcome this problem, and to provide an improved device for lighting applications.

This and other objects that will be evident from the following description are achieved by means of an illuminator comprising a spatial light modulator including an array of elements each adapted to selectively transmit incoming light without altering the direction of the light, or alter the direction of incoming light; a lamp arranged to illuminate the modulator; a lens for directing unaltered light from the modulator onto an illumination surface; and means for forwarding essentially all light altered in direction by the modulator towards the illumination surface.

The invention is based on the understanding that by redistributing the part of the light from the lamp that is altered in direction by the modulator (instead of absorbing or otherwise abduct this light as in prior art), it is possible to provide an illuminator for generating certain lighting effects, in which illuminator the loss of light, especially at high angles, is significantly decreased. The light can be forwarded either directly to the illumination surface or via the lens.

The forwarding of light can be achieved in various ways.

In one embodiment, the forwarding means comprises a reflector adapted to reflect light altered in direction by the modulator towards the illumination surface. Preferably, the reflector is formed as a tapering tube, wherein the modulator is positioned at the narrow end of the tube, and the wider end of the tube is directed towards the illumination surface, and wherein the cross section of the tube essentially matching the shape of the modulator, so that even light leaving the modulator at high angles can be reflected towards the illumination surface.

In another embodiment, the forwarding means comprises a segmented lens, wherein the lens for directing unaltered light from the modulator onto the illumination surface ("light directing lens") is formed by a portion of the segmented lens. Preferably, the segmented lens has a central first portion and a peripheral second portion, wherein the first portion has a different focal length and/or optical axis than the second portion. The light-directing lens is preferably formed by the central first portion, which receives essentially all unaltered light from the modulator. Thus, for light that is transmitted through the modulator unaltered, the image is formed by the central portion of the segmented lens. On the other hand, for light that is altered by the modulator, the light reaching the central portion will lead to image formation at a different position on the illumination surface than the light reaching the peripheral portion, due to the difference in focal length and/or optical axis of the two portions. This makes it possible to achieve some contrast in the formed image/pattern. Preferably, the segmented lens has such a diameter that the peripheral second portion can intercept essentially all of the light altered in direction by the modulator and direct the light towards the illumination surface. The segmented lens can be used with or without the above-mentioned reflector.

The illuminator can further comprise a second lens positioned between the lamp and the modulator. The second lens can have a different diameter and/or different focal length than the first lens. This allows more possibilities for beam shaping. The second lens can be used with the above-mentioned reflector and/or the above-mentioned segmented lens.

The illuminator can further comprise a non-absorbing diaphragm positioned between the modulator and the first lens. Preferably, the non-absorbing diaphragm is adapted to alter the direction of light falling onto it, preferably forward towards the illumination surface. Such a diaphragm can be made of a scattering material, which scatters incoming light in any, or a particular direction. Alternatively, the diaphragm can be refractive or diffractive. Such a diaphragm can comprise a micro lens array, blazed grating, ruled grating, phase grating, etc.

In one embodiment, the diaphragm has an aperture, whereby light from the lamp is focused onto the aperture, for example by means of the second lens, by a reflector in or in relation to the lamp, or by a combination of both. Aperture should here be construed as an opening or transparent part of the diaphragm that transmits light without altering its direction. Thus, light that is transmitted through the modulator without begin altered in direction is passed through the aperture, while light originating from the elements of the modulator where the path (i.e. direction) gets altered will not be passing through the aperture but falling onto the scattering (or diffracting or refracting) regions of the diaphragm. In this way the effect of light path diversion can be amplified and/or light can be directed in a specific direction enabling higher contrast and more control over the beam shape.

In another embodiment, the non-absorbing diaphragm has locally adjustable light transmission characteristics. This gives even more control over beam shaping.

The direction of incoming light can be altered by the modulator using effects such as scattering, refraction, or diffraction. The modulator can for example be a pixilated liquid crystal cell.

This and other aspects of the present invention will now be described in more detail; with reference to the appended drawings showing currently preferred embodiments of the invention.

Figure 2:
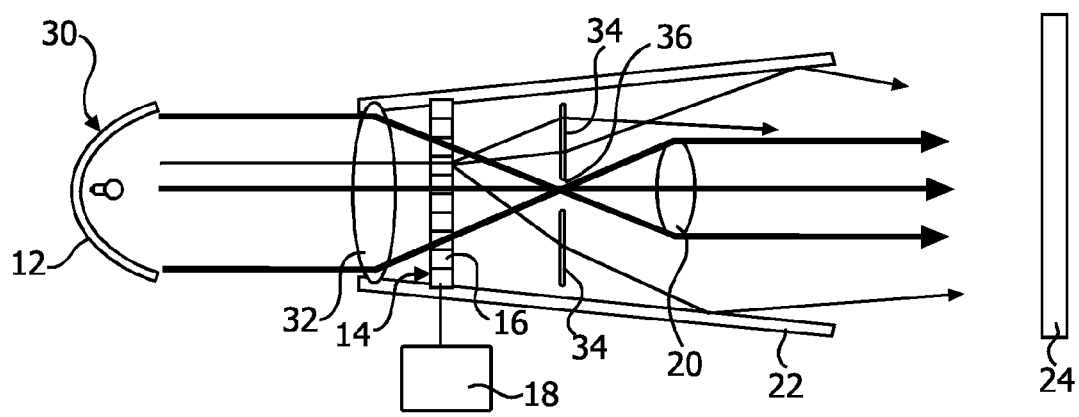
Figure 3:
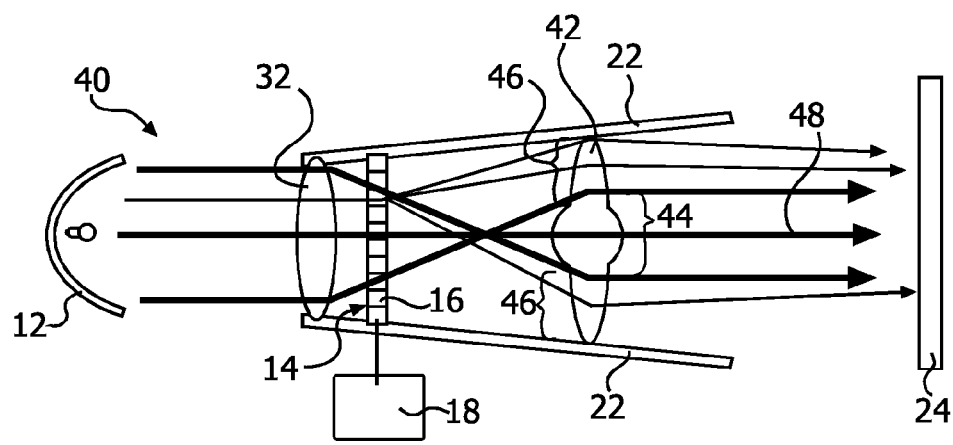

FIG. 1 is a schematic side view of an illuminator according to an embodiment of the invention, FIG. 2 is a schematic side view of an illuminator according to another embodiment of the invention, and FIG. 3 is a schematic side view of an illuminator according to yet another embodiment of the invention.

In the figures, like elements are designated with the same reference numbers.

FIG. 1 is a schematic side view of an illuminator 10 according to an embodiment of the invention. The illuminator 10 comprises a lamp 12, a spatial light modulator 14 including an array of light modulating elements 16, a control device 18 for receiving data and for controlling the modulator 14 accordingly, and a lens 20.

The lamp 12 can for example be a light emitting diode light source.

Each element 16 is adapted to selectively transmit incoming light (that is, without significantly altering the direction or path of the light) or alter the direction of incoming light, depending in its selected state. The light modulator 14 can for example be a pixilated liquid crystal cell with active matrix, multiplexed or direct electrical addressing, and the alteration of direction or path can be achieved using electrically controllable liquid crystal effects, such as scattering, refraction, or diffraction. Various liquid crystal devices suitable for this invention will be apparent to those skilled in the art.

The illuminator 10 further comprises a reflector 22. The reflector 22 in FIG. 1 is illustrated in cross section and formed as a tapering tube, the transversal cross section of the tube essentially matching the shape of the modulator 14, where the modulator 14 is positioned at the narrow end of the tube, and the wider end of the tube is directed towards the illumination surface 24.

Upon operation of the illuminator 10, the lamp 12 illuminates the modulator 14. The state of the elements 16 of the modulator 14 is controlled by the control device 18 based on received data relating to the image or pattern or the like to be projected. Depending on which state it is in; each element 16 either directly transmits the incoming light or alters the direction of the incoming light. Light that is directly transmitted is indicated by thicker lines, while light altered in direction is indicated by thinner lines. As an example, element 16a transmits light, while element 16b alters the direction of the light, for instance by means of scattering.

Light that is directly transmitted through the modulator 14 is projected by the lens 20 onto an illumination surface 24 to form a lighting effect, such as an image, text, etc.

On the other hand, light that is altered in direction by the modulator 14 is either directed onto the illumination surface 24 via the lens 20, or reflected by the reflector 22 towards the illumination surface 24. As can be seen, even light exiting the modulator 14 at a steep angle is forwarded towards the illumination surface 24. Thus, essentially all light altered in direction by the modulator 14 is forwarded towards the illumination surface 24, and forms, together with the light transmitted without being altered through the modulator 14, the desired lighting effect on the illumination surface 24. Simulations show that areas on the illumination surface that correspond to scattering (for example) areas on the modulator have lower intensity, while the reduced intensity is redistributed to other areas of the illumination surface.

FIG. 2 is a schematic side view of an illuminator 30 according to another embodiment of the invention. In addition to what is disclosed in FIG. 1, the illuminator 30 further comprises a second lens 32 positioned between the lamp 12 and the modulator 14. The lens 32 focuses light from the lamp 12. In FIG. 2, the focal point of the lens 32 coincide with the focal point of the first lens 20, whereby beams that are transmitted through the modulator 14 without any change in direction are directed essentially in parallel onto the illumination surface 24 by the first lens 20. On the other hand, light that is altered in direction by the modulator 14 is either directed onto the illumination surface 24 via the first lens 20, or reflected by the reflector 22 towards the illumination surface 24. In another configuration (not shown), the first lens 20 has a focal length that corresponds to the distance to the modulator 14, whereby the image of the modulator is projected onto the illumination surface 24.

Optionally, the illuminator 30 can comprise a non-absorbing diaphragm 34 positioned between the modulator 14 and the first lens 20. The diaphragm 34 can for example be a scattering diaphragm. The diaphragm 34 in FIG. 2 comprises a transparent aperture 36. The diaphragm 34 is placed at distance from the second lens 32 corresponding to the focal length of the second lens 32, whereby, upon operation of the illuminator 30, beams that are transmitted through the modulator 14 without any change in direction are focused on the aperture 36. This in turn results in that these beams pass the diaphragm 34 on to the first lens 20. The size of the aperture 36 can be determined by the quality of the lamp (spread of light bundle). On the other hand, beams or rays of light that are altered in direction at the modulator 14 and "miss" the aperture 36 are scattered by the diaphragm 34. Some of this light is scattered directly towards the first lens 20 and/or the illumination surface 24, and some is scattered towards the reflector 22, which in turn reflects the light in the direction of the illumination surface 24. Thus, essentially all light altered in direction by the modulator 14 is forwarded towards the illumination surface 24, and forms, together with the light transmitted without being altered through the modulator 14, the desired lighting effect on the illumination surface 24. Simulations show that by means of the diaphragm 34 and aperture 36, the contrast of the formed light effect is increased with almost no light loss at the illumination surface. Again, in an alternative configuration, the modulator 14 can be place at the focal distance of the first lens 20, whereby the image of the modulator is projected onto the illumination surface 24. In such a configuration, the first lens 20 has a longer focal length than the second lens 32.

It should be noted that focused light from the lamp alternatively could be achieved by means of reflector means provided in or in relation to the lamp, or by a combination of such reflector means and the second lens.

Instead of a non-absorbing diaphragm having an aperture, a non-absorbing diaphragm having locally adjustable light transmission characteristics can be used. That is, at least one portion of the diaphragm can be selected to transmit incoming light without altering its direction, and at least one portion of the diaphragm can be selected to alter the direction of incoming light striking that portion(s). Such a diaphragm can for example be realized by a liquid crystal cell, which can be locally addressed and exhibits electrically controllable effects such as scattering, diffraction, or refraction.

FIG. 3 is a schematic side view of an illuminator 40 according to yet another embodiment of the invention. In comparison to what is disclosed in FIG. 1, the illuminator 40 comprises a second lens 32 and a segmented lens 42.

The segmented lens 42 in FIG. 3 has a central first portion 44 with a first focal distance, and a peripheral second portion 46 with a second focal distance different than the first focal distance. Alternatively, the two portions can have the same focal length, but different optical axis.

The lenses 32 and 42 are further so arranged that, upon operation of the illuminator 40, beams that are transmitted through the modulator 14 without any change in direction are incident on the central first portion 44 of the segmented lens 42. This can be achieved by selecting suitable sizes, focal lengths, and/or positions, etc. for the lenses 32 and 42. The beams incident on the central first portion 44 can then be projected or directed onto the illumination surface 24 to form an image, pattern, etc. On the other hand, for light that is altered by the modulator 14, the light reaching the central portion 44 will lead to image formation at a different position on the illumination surface 24 than the light reaching (either directly or after reflection by the reflector 22) the peripheral portion 46, due to the difference in focal length and/or optical axis of the two portions. Thus, essentially all light altered in direction by the modulator 14 is forwarded towards the illumination surface 24 and forms, together with the light transmitted without being altered through the modulator 14, the desired lighting effect on the illumination surface 24.

In FIG. 3, the focal point of the second lens 32 coincide with the focal point of the central portion 44 of the segmented lens 42, and the beams are directed essentially parallel to an optical axis 48 of the illuminator onto the illumination surface 24. In an alternative configuration, the modulator 14 can be place at the focal distance of the central portion 44 of the segmented lens 42, whereby the image of the modulator is projected onto the illumination surface 24. Also, the segmented lens can be placed at around the focal distance of the second lens 32 to ensure that essentially all light not altered in direction by the modulator 14 is incident on the central portion 44. In this case, the quality of the lamp, i.e. the spread of the light bundle, can determine the size of the central portion 44.

It should be noted that both the reflector 22 and/or the second lens 32 could be omitted in the embodiment shown in FIG. 3. In the former case, the segmented lens 42 preferably has such a diameter that the peripheral second portion 46 can intercept almost all of the light altered in direction by the modulator 14 and direct the light towards the illumination surface 24.

The person skilled in the art realizes that the present invention by no means is limited to the preferred embodiments described above. On the contrary, many modifications and variations are possible within the scope of the appended claims.

The invention claimed is:

1. An illuminator, comprising:
 a spatial light modulator for controllably transmitting incoming light, the modulator configured to transmit a first portion of the incoming light without altering the direction thereof and to alter the direction of a second portion of the incoming light transmitted therethrough, the modulator including an array of elements each adapted to selectively control the direction of the incoming light;
 a lamp arranged to illuminate said modulator;
 an optical means for directing at least the first portion of the transmitted light from said modulator onto an illumination surface and forwarding at least a fraction of the second portion of the transmitted light from said modulator towards the illumination surface.

2. An illuminator according to claim 1, wherein the optical means comprises a segmented lens having a central first portion and a peripheral second portion, the first portion having a different focal length and/or optical axis than the second portion and configured to direct at least the first portion of the transmitted light from said modulator onto the illumination surface.

3. An illuminator according to claim 1, further comprising an auxiliary lens positioned between the lamp and the modulator and having a different diameter and/or different focal length than the first portion of the segmented lens.

4. An illuminator according to claim 1, further comprising a non-absorbing diaphragm positioned between the modulator and said segmented lens, said non-absorbing diaphragm being adapted to alter the direction of the transmitted light towards the illumination surface.

5. An illuminator according to claim 4, wherein the non-absorbing diaphragm has an aperture, and wherein light from said lamp is focused onto said aperture.

* * * * *